United States Patent

[11] 3,550,790

[72] Inventor Allen T. Noble
 105 Crestline Drive, Boise, Idaho 83702
[21] Appl. No. 790,095
[22] Filed Jan. 9, 1969
[45] Patented Dec. 29, 1970

[54] ARTICLE RELOCATING SYSTEMS
 11 Claims, 8 Drawing Figs.
[52] U.S. Cl........................................................ 214/1,
 198/124; 214/83.36
[51] Int. Cl......................................................... B65g 69/00
[50] Field of Search............................................ 221/185;-
 222/(Inquired); 214/1DL, 1, 152; 111/3, 2, 36, 51,
 42; 104/5, 6

[56] References Cited
UNITED STATES PATENTS

| | | | |
|---|---|---|---|
| 342,490 | 5/1886 | Zimmerman.................. | 111/3 |
| 2,005,442 | 6/1935 | Spiegl............................ | (214/83.1UX) |
| 2,635,736 | 4/1953 | Rust............................... | 198/208 |
| 2,780,376 | 2/1957 | Sanders......................... | 214/1(P.L.)x |
| 3,082,883 | 3/1963 | Smeal............................ | 214/1(P.L.) |
| 3,344,830 | 10/1967 | Longman....................... | 111/3X |
| 3,350,769 | 11/1967 | Berry............................. | 214/1(P.L.)X |

*Primary Examiner*—Gerald M. Forlenza
*Assistant Examiner*—Frank E. Werner
*Attorney*—Shanley & O'Neil ABSTRACT: Systems for relocating articles, particularly sprinkler-irrigation pipe sections coupled in end-to-end relationship to define a pipeline and irrigating a long, narrow zone in a field. A mobile frame carrying a conveyor is moved along the pipeline. As the frame moves along the pipeline, pipe sections are uncoupled from one another, deposited on the conveyor, transported transversely to the direction of movement of the frame, and delivered onto the surface of the earth in generally end-to-end relationship and spaced from the pipeline. The delivered pipe sections are then coupled to form a second pipeline for irrigation of another zone in the field, contiguous to the first zone. The pipe sections are automatically dropped in close end-to-end relationship and with sprinkler risers in upright positions, to minimize manual manipulation of the pipe sections. Upright sprinkler riser positioning is effected by supporting the risers while on the conveyor in a position such that, upon dropping of the pipe section from the conveyor, the pipes roll to swing the risers upright. Direction of movement of the frame is maintained in alignment with crop rows by a device which detects location of the crops rows, and automatically operates a steering mechanism for the frame.

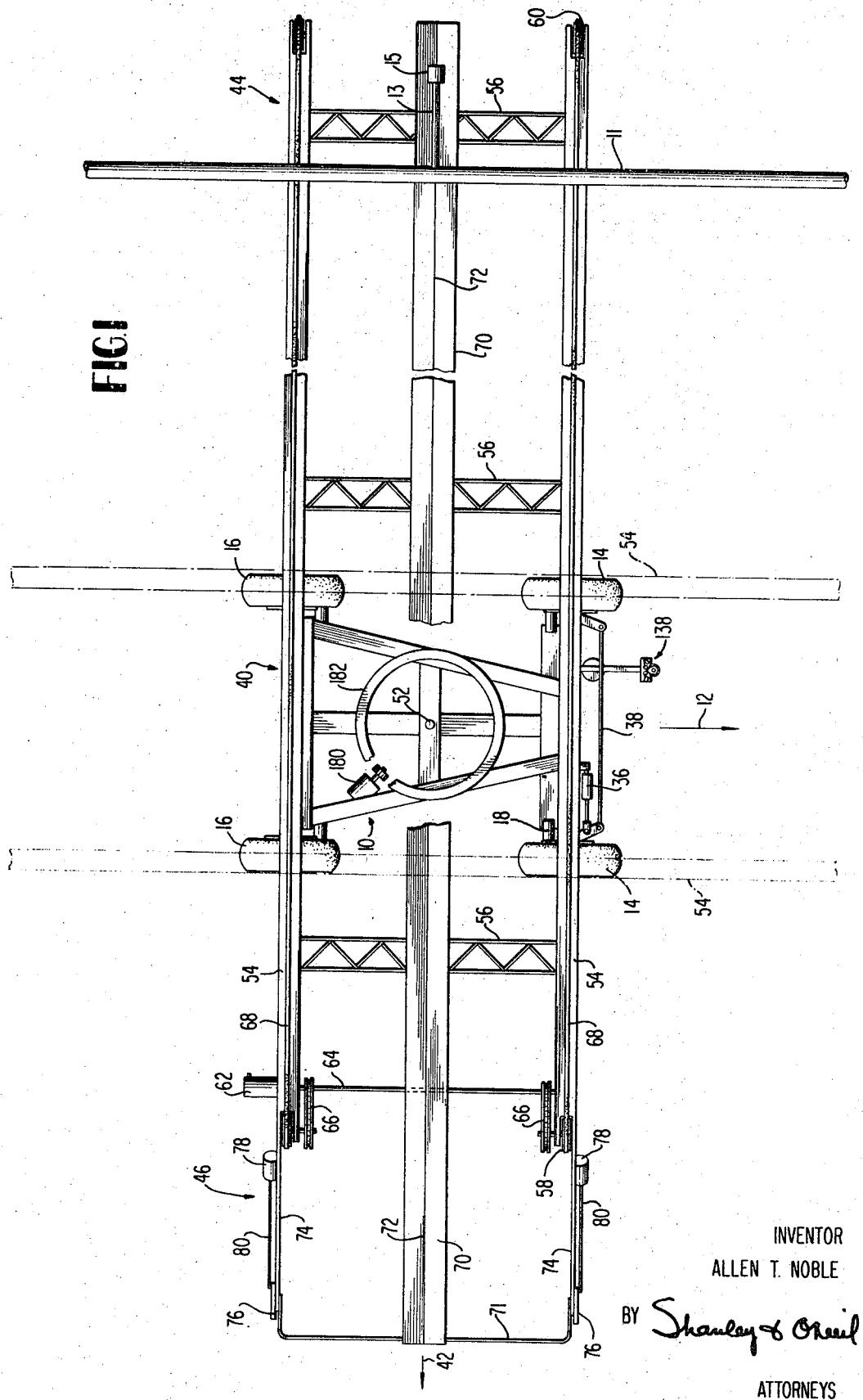

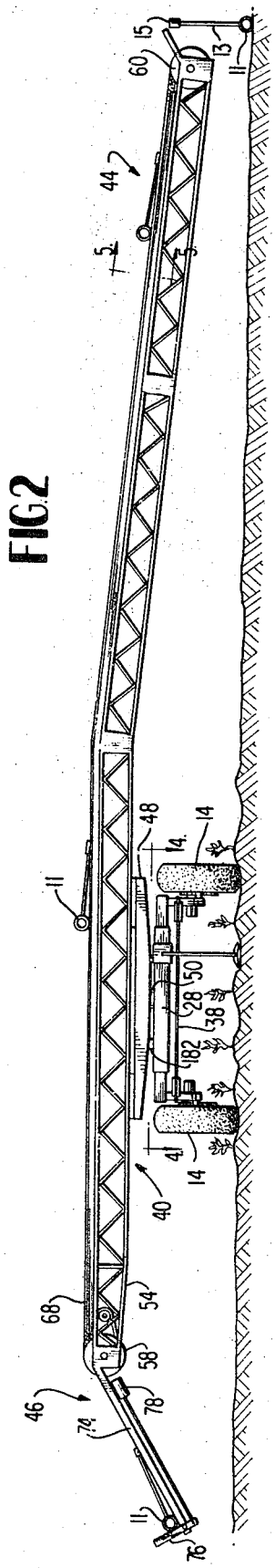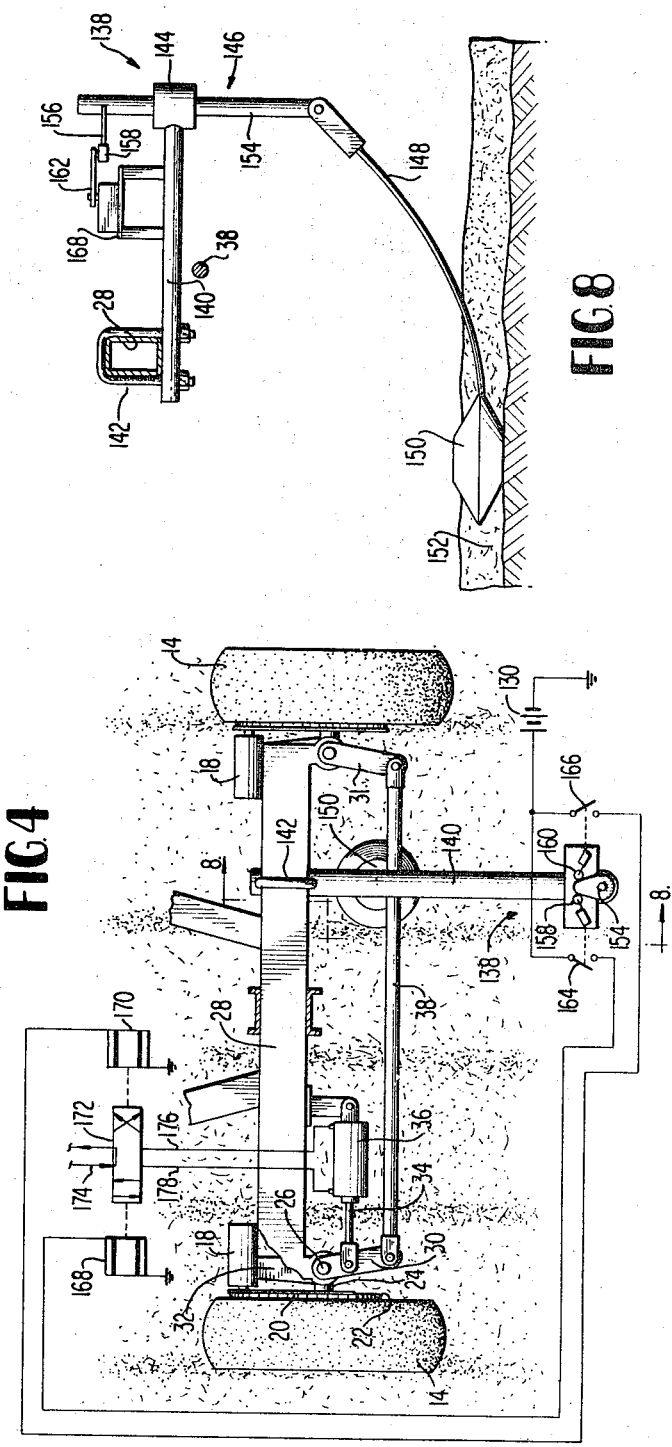

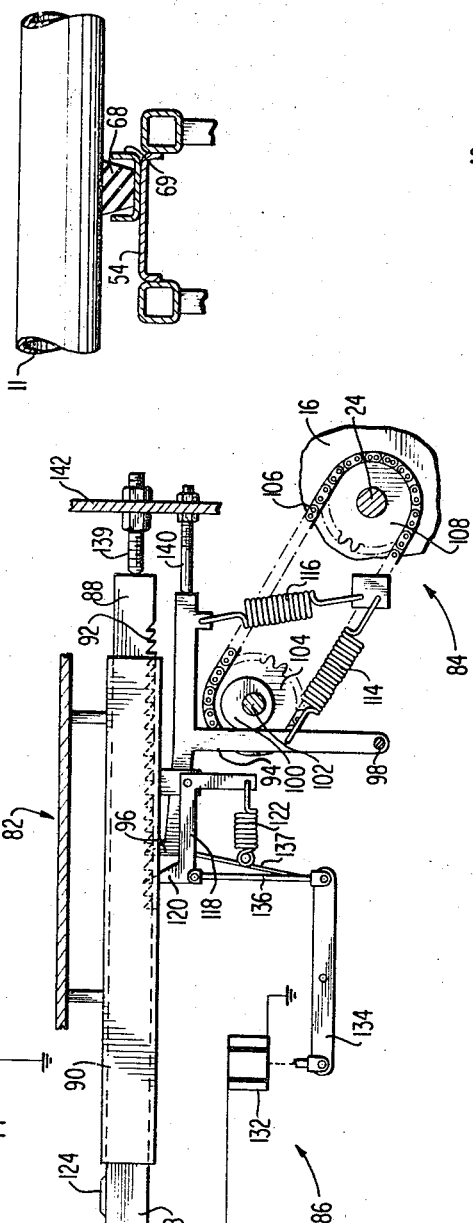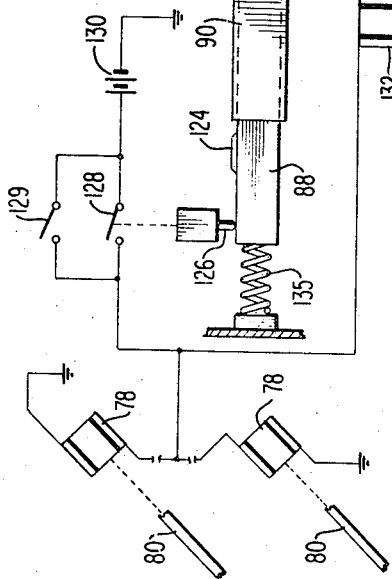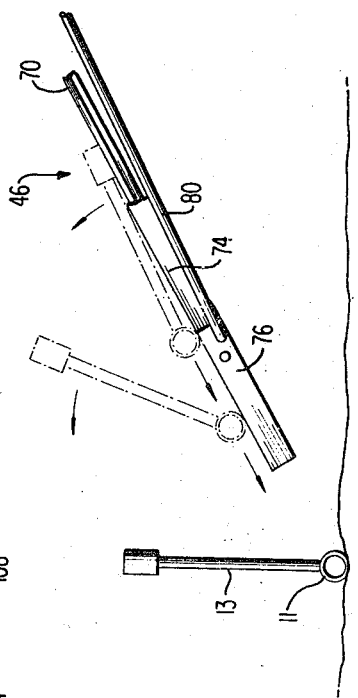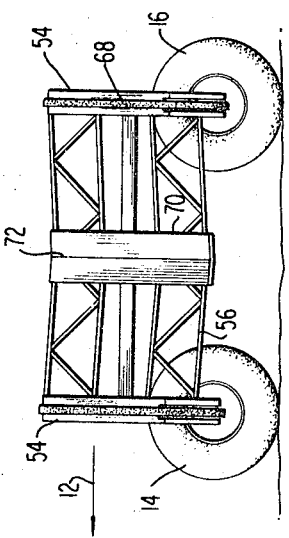

ARTICLE RELOCATING SYSTEMS

BACKGROUND OF THE INVENTION

This invention relates to article relocating systems. In its more particular aspects, the invention pertains to systems for relocating sprinkler-irrigation pipe section in fields employed in agriculture.

Fields are often irrigated by sprinkler pipe sections coupled in end-to-end relationship to define a pipeline which extends a substantial distance across the field. The irrigation pattern produced by such an arrangement is as long as the pipeline, but is limited in width to the distance that water is projected from the sprinkler heads. To irrigate the entire field, it is necessary to periodically displace the pipeline transversely relative to its length a distance equal to the width of the area which can be irrigated by the sprinkler heads at one time. The pipeline must be moved many times before all portions of the field can be watered, because the width of the area which can be irrigated at one time is quite narrow relative to the width of the field.

Such displacement of pipelines has been performed in the past with much hand labor. Pipe sections forming the pipeline are uncoupled from one another, picked up by laborers, carried by the men across the field, deposited by them at a distance from the pipeline approximately equal to the width of the irrigation pattern, and recoupled to reform the pipeline. The men then return to the first pipeline to repeat the process as many times as there are pipe sections. This system is time-consuming, laborious and expensive, and can result in extensive crop damage because of the large amount of foot traffic through growing crops.

Accordingly, a main object of the invention is provision of improved systems for relocating articles, particularly sprinkler-irrigation pipe sections, in a rapid, economical manner with a minimum amount of traffic.

Other objects of the invention will appear from the following detailed description which, together with the accompanying drawings, discloses a preferred embodiment of the invention for purposes of illustration only. For definition of the invention, reference will be made to the appended claims.

BRIEF DESCRIPTION OF THE DRAWINGS

In the drawings, similar reference characters denote similar elements throughout the several views, and:

FIG. 1 is a plan view of apparatus embodying principles of the invention;

FIG. 2 is a front elevational view of the apparatus of FIG. 1;

FIG. 3 is a right side elevational view of the apparatus of FIG. 1;

FIG. 4 is a partially schematic, cross-sectional view on line 4-4 of FIG. 2;

FIG. 5 is an enlarged view on section line 5-5 of FIG. 2;

FIG. 6 is a detail view showing operation of the apparatus of FIG 1;

FIG. 7 is a partially schematic view showing details of the apparatus of FIG. 1; and FIG 8 is a cross-sectional view on line 8-8 of FIG. 4.

DESCRIPTION OF THE PREFERRED EMBODIMENT

FIGS. 1—2 depict a pipe-section relocating apparatus including a body or frame, generally indicated at 10, and transporting means in the form of wheels which mount frame 10 for movement in the direction indicated by arrow 12. Front and rear wheels are indicated at 14, 16 respectively. Each wheel is independently driven by a hydraulic motor 18 through a chain 20 (FIG. 4). Each chain 20 meshes with an annular sprocket 22 fixed to the respective wheel in concentric relationship to the axis of rotation of the wheel.

Each front wheel 14 has an axle 24 journaled in the lower portion of an upstanding shaft 26. Each shaft 26 is mounted on a crossmember 28 of frame 10, for rotation about the upright axis of the shaft. The tops of shafts 26 are fixed to steering arms 30, 31, respectively. A motor support 32 is fixedly secured to each shaft 26 at a location intermediate the steering arm and axle 24. Support 32 extends rearwardly, and turns with shaft 26 and thus with the front wheels, to maintain the motor drive sprocket in alignment with drive chain 20 and wheel sprocket 22 as front wheels 14 are moved to steer frame 10.

A piston rod 34 is pivotally secured to the central portion of steering arm 30. Rod 34 is secured to a piston in a hydraulic power steering cylinder 36 which is pivotally mounted on crossmember 28. The extreme forward ends of steering arms 30, 31 are pivotally secured to the opposite ends of a tie rod 38. Movement of tie rod 38 transversely to the direction of motion of the frame is effected through movement of steering arms 30, 31 by operation of hydraulic cylinder 36. With tie rod movement, shafts 26 are rotated about their axes and thus turn front wheels 14 to steer the frame.

Frame 10 carries conveying means generally indicated at 40 (FIGS. 1, 2). Conveyor 40 receives elongated sprinkler-irrigation pipe sections 22, conveys the pipe sections along a path transverse to the direction of movement of frame 10, and delivers the pipe sections in a direction (indicated by arrow 42) transverse to the direction of movement of frame 10 to a location on the surface of the earth. Conveyor 40 has load and delivery end portions generally indicated at 44, 46, respectively. The length of conveyor 40, i.e., the dimension in the direction of conveyance of pipe sections 11, is generally equal to the width dimension of the zone which is irrigated by the pipe sections at one time. This width dimension, which is transverse to the direction of elongation of the pipe section, varies to some extent with factors such as water pressure, but in most circumstances a conveyor length of about 50 or 60 feet will obtain the desired result of displacing the pipe sections a distance sufficient to avoid overlap of or vacant spaces between contiguous zones irrigated by the pipeline before and after a relocation.

Conveyor 40 includes a platform 48 (FIG. 2) fixed to a downwardly projecting stub shaft 50 rotatably received at 52 (FIG. 1) in frame 10. Spaced-apart side booms 54 are fixed to platform 48 and secured in rigid assembly by plurality of crossmembers 56. A driven pulley 58 is journaled in each boom 54 at the left end of the boom as viewed in FIG. 1. Idler pulleys 60 are journaled in the right ends of the booms.

Pulleys 58 are driven by hydraulic motor 62 through a shaft 64 and drive chains 66. Each of a pair of generally parallel, endless conveyor belts 68 is trained over the pulleys on one of the booms 54. Each belt 68 rides in a track 69 (FIG. 5) mounted on top of a boom 54. Tracks 69 receive, guide, and prevent sagging of the belts, which project above the tracks so that only the top surface of the belts are engaged by pipe sections 11. Belts 68 run in synchronism, supporting pipe sections 11 athwart conveyor 40.

Each pipe section 11 includes a sprinkler riser 13 (FIGS. 1, 2) which extends from one side of the pipe section in a direction transverse to the direction of elongation of the pipe section. The free end of the riser includes a sprinkler head 15, which projects water in all directions. Conveyor 40 includes a skid 70 which supports the risers, and thus prevents the pipe sections from rolling on the conveyor. Skid 70 extends along endless belts 68, and is disposed centrally between the belts. Skid 70 is slightly V-shaped in cross section (FIGS. 1, 3) to provide a trough or groove 72. The skid is in generally coplanar relationship with belts 68, so that it can support riser 13 with trough 72 receiving the free end of the riser (FIGS. 1, 2). Trough 72 maintains the pipe section in proper alignment athwart the conveyor, because once a pipe section is deposited on the conveyor with the riser in trough 72, gravity keeps the riser in trough 72, and thus prevents the pipe section from drifting to either side of the conveyor as it is transported to delivery end portion 46.

The delivery end portion of conveyor 40 includes spaced-apart side slides 74 (FIGS. 1, 2) which extend downwardly from the ends of the belt portion of conveyor 40 toward the surface of the earth. Skid 70, at the delivery end portion of the conveyor, slopes downwardly in generally parallel coplanar relationship to the slides 74. The conveyed pipe sections, after passing over the ends of conveyor belts 68, pass down slides 74 under the pull of gravity. Retainers 76, located at the bottom of slides 74, retain the pipe sections from delivery by the conveyor until the mobile frame has been positioned to deliver the pipe to a location on the surface of the earth where it will be in generally end-to-end relation with a previously deposited pipe section.

Each retaining member 76 is pivotally mounted on the lower end of a slide 74. Each retainer 76, when in its operative position, as shown in FIG. 2, is generally perpendicular to slides 74, and retains the pipe section by obstructing the path of the pipe sections on conveyor 40. By swinging each retainer 76 about its pivot point on the respective slide 74, it is moved to an inoperative position (FIG. 6) out of the path of the pipe sections and generally colinear with the slide, so that pipe sections can be delivered from conveyor 40.

Retainers 76 are deactivated, i.e., moved from operative to inoperative position, by a pair of solenoids 78 (FIGS. 1, 2). Each solenoid 78 operates through a rigid rod 80 which has opposite ends respectively pivotally connected to a retainer and to the solenoid plunger. Axial movement of rod 80 swings retainer 76 about its pivot point on slide 74 to operative and inoperative positions.

Skid 70, at the delivery end portion of the conveyor, is held by brace 71 at an angle to the horizontal to support the sprinkler risers 13 in position for delivery on the surface of the earth with the riser generally upright, so that machine operators will not have to perform this operation by hand labor. FIG. 6 depicts the movements of a pipe section undergoing delivery from the conveyor. Pipe section 11 is shown first at an upper position at which it is held by retainers 76, awaiting arrival of frame 10 at the desired location for a pipe drop. When retainers 76 have been moved to inoperative positions, as illustrated in FIG. 6, pipe section 11 starts to drop by gravity, sliding down the retainer 76, and at the same time rolling in a counterclockwise direction as a result of friction forces acting between the surfaces of the retainers and the pipe section. In the lowermost illustrated position of pipe section 11, it has come to rest on the surface of the earth with the riser upright.

It will be appreciated that the angle of the delivery end of skid 70 which is necessary to effect this result will vary with the pipe diameter, the distance it must roll, and other factors. For pipes about four inches in diameter rolling about one foot, disposition of skid 70 at an angle of about 30° to the horizontal is satisfactory.

A spacing control system controls solenoids 78 for delivery of pipe sections at spaced locations along the direction of movement of frame 10. The pipe sections are sequentially deposited on the surface of the earth in generally end-to-end relationship as closely as possible to one another, for formation of a new pipeline with minimum manual manipulation of the pipe sections.

The article spacing control system is generally indicated at 82 (FIG. 7), and includes a sensing mechanism, generally indicated at 84, for sensing movement of frame 10 a predetermined distance along its direction of motion. Spacing control 82 also includes an operating mechanism, generally indicated at 86, which is responsive to sensing mechanism 84 to operate solenoids 78 when the frame has moved this predetermined distance.

Operating mechanism 86 includes a plunger 88 axially slidably received in a tubular guide 90 which is fixedly mounted on frame 10. The bottom surface of plunger 88 includes a plurality of teeth 92. Plunger 88 is ratcheted to the left as viewed in FIG. 7 by a driver 94 having a projection 96 which extends through an elongated slot in the bottom of tubular guide 90 and engages driver teeth 92. Driver 94 is generally T-shaped, and is pivotally mounted on frame 10 at 98. Driver 94 is moved about pivot 98 by an eccentric 100 rigidly mounted on shaft 102 of a sprocket 104. The sprocket is rotated by a chain 106 driven by a sprocket 108 rigidly mounted on axle 24 of right rear drive wheel 16 (FIG. 1). This wheel meters the distance traveled by the frame, as the wheel rolls over the surface of the earth, sensing the distance moved by the frame by rotating a given number of times per unit of linear distance moved by the frame.

As wheel 16 rotates, eccentric 100 (FIG. 7) rotates about the axis of shaft 102. Large and small portions of the eccentric alternately bear on the upright arm of the driver, in repeated cycles. With each return of the enlarged portion of eccentric 100 to bear against the vertical arm of the driver, the enlarged portion swings driver 94 counterclockwise about pivot point 98. When the driver swings counterclockwise, it moves plunger 88 to the left because projection 96 of the driver is in engagement with one of the teeth 92 on plunger 88. Springs 114, 116, mounted on frame 10 bias driver 94 for rotation in a clockwise direction about pivot point 98. Hence, after counterclockwise movement of the driver, and the return of the small portion of eccentric 100 to a location between shaft 102 and driver 94, driver 94 pivots clockwise to engage a succeeding tooth on plunger 88. Projection 120 on holder 118, which rides along surfaces of teeth 92 while driver 94 moves plunger 88 to the left, drops between teeth to hold plunger 88 against movement to the right at the end of the driver's counterclockwise stroke. Holder 120 is pivotally mounted on a bracket on guide 90, and is biased by spring 122 for movement in a counterclockwise direction. Spring 122 is securely mounted on frame 10.

Plunger 88 includes a protrusion 124 on its left end. After plunger 88 has been driven from its starting position at the right of the drawing by a number of rotations of eccentric 100 by right rear wheel 16, protrusion 124 contacts a plunger 126 and moves the plunger upwardly to close the contacts of a switch 128. This closes an electrical circuit between a battery 130 and solenoids 78, which deactivate retainers 76. Closure of the circuit energizes solenoids 78, moving rods 80 upwardly, thereby pivoting retainers 76 to their inoperative positions for dropping of a pipe section form conveyor 40.

Closure of switch 128 also closes a circuit from battery 130 to energize a solenoid 132. This solenoid, when energized, pulls upwardly on the left end of a lever 134, which is centrally pivotally mounted on frame 10. This pulls downwardly on the right end of the lever. The right end of lever 134 is secured to holder 118 and to driver 94 by cables 136, 137, respectively, so that downward movement of the right end of the lever moves the driver and the holder counterclockwise, allowing spring 135 to return plunger 88 to its starting position. Return movement of plunger 88 opens switch 128, deenergizing solenoids 78, so that rods 80 return downwardly by action of a spring in the solenoids, thereby moving retainers 76 to their operative positions obstructing the path of pipe sections on the conveyor.

Threaded shafts 139, 140 bear against plunger 88 and driver 94, respectively, and are received in a plate 142 fixed to frame 10. Adjustment of nuts on shaft 139 adjusts the distance of projection of shaft 139 toward plunger 88, thereby adjusting the distance of travel of plunger 88 between starting and switch-trip positions for adjustment of distance between pipe drops for maximum end-to-end proximity of delivered pipe sections. Plunger 88 is adjusted to travel from start to switch-trip position with travel of frame 10 from one pipe-drop location to the next. For proper operation of the automatic pipe spacing control system, the pipe sections must be of equal length, so that distances between pipe drops (each of which is equal to the length of one pipe section) will be equal and can be correlated with distance of travel of plunger 88. Adjustment of nuts on shaft 140 adjusts travel of driver 94 for optimum working relationship with plunger 88. Closure of manual switch 129, which is in parallel circuit relationship with switch 128, closes the same circuits as closure of switch 128 so that pipe drops can be effected without the automatic spacing control.

Since sprinkler-irrigaton pipelines are often laid in the direction in which rows of crops are planted, a control system is provided to automatically steer the frame along the crop rows. The control system is responsive to a mechanism which detects the location of crop rows, and operates the steering system to maintain the direction of travel of the frame in alignment with the direction of the crop row. This row detecting or sensing mechanism is generally indicated at 138 (FIGS. 4, 8) and includes an arm 140 secured by U-bolt 142 to frame crossmember 28. Arm 140 projects in the direction of travel of the frame. The forward end of arm 140 includes a bearing 144 which pivotally mounts a support member 146 for rotation around the upright axis of upper portion 154 of support 146. The support is articulated, having a lower portion in the form of a curved rod 148. The lower end of rod 148 is secured to a row-tracking member in the form of a weighted disc 150 having a bottom portion with a configuration conforming to the configuration of a furrow 152 which is located between, and generally parallel to, contiguous crop rows. Curved rod 148 is pivotally mounted on upper portion 154 of support 146 for movement about a horizontal axis. This permits tracker 150 to move upwardly and downwardly with vertical undulations in the surface of the earth. As frame 10 moves along the surface of the earth, tracker 150 follows the furrow, thereby pivoting support 146 about the upright axis of member 154 in accordance with drift of frame 10 from the direction of the furrow.

As support 146 pivots, it swings a cam plate 156 which is fixed to the upper portion 154 of support 146. As cam 156 swings horizontally around the axis of member 154 to one side or the other of a central position occupied when the frame 10 is steered straight ahead, the cam engages one or the other of rollers 158, 160 which are mounted on swingable arms such as 162, and which open and close the contacts of switches 164 and 166, respectively. The rollers are mounted on a table 168 carried by arm 140.

Switches 164, 166, by being positioned to engage cam 156 at various locations on its path of movement, are responsive to the position of the cam to operate power steering cylinder 36 to steer frame 10 in accordance with drift of the frame to one side or the other of the furrow and therefore the crop rows. The location of the crop rows are thus sensed indirectly by tracker 150 through sensing of the location of the furrow.

Closure of switches 164, 166 respectively, closes electrical circuits between battery 130 and solenoids 168, 170 which operate a three-way hydraulic valve 172 to extend or retract piston rod 34 and thus move tie rod 38 laterally to steer frame 10. Thus, if frame 10 tends to move to the left of the furrow (considering "left" from the viewpoint of a person riding on the frame and facing forward) tracker disc 150 swings to the right, the rear portion of cam plate 156 swings counterclockwise about the upright axis of member 154, and engages roller 158 to close the contacts of switch 164. This energizes solenoid 168 to move valve 172 to the right, sending hydraulic fluid from input line 174 from a reservoir (not shown) into cylinder 36 by way of line 176 to extend piston rod 34. This moves tie rod 38 to the right, and steers the front wheels 14 to the right and thus into alignment with the crop row.

If frame 10 wanders to the right of the furrow, tracker 150 moves to the left and the rear end portion of cam 156 moves to the left, thereby engaging roller 160 to close the contacts of switch 166. This energizes solenoid 170 to move valve 172 to the left for passage of hydraulic fluid from input line 174 into conduit 178 to retract piston rod 34. This moves tie rod 38 to the left and steers the wheels to the left, to compensate for drift of the frame to the right of the furrow.

Conveyor 40 is mounted on frame 10 for pivotal movement over an angular distance of 180°. It is desirable that the conveyor be movable 90° so that its longitudinal dimension can be aligned with the direction of travel of the frame. This facilitates movement of the apparatus over roads to and from fields where it is employed for pipeline displacement. It is desirable that the conveyor be movable 180°, so that it can be used to convey pipe sections from and to either side of the direction of movement of the frame. In FIG. 1, phantom lines indicate the position of booms 54 when conveyor 40 is arranged for road travel. Rotation of conveyor 40 is effected by a hydraulic motor 180 which is mounted on frame 10 and includes a drive pinion meshing with a ring gear 182 secured to the underside of platform 48. During road travel, row finder 138 is deactivated by swinging rod 148 upwardly to move disc 150 out of engagement with the surface of the earth, and holding the disc in this position. Hydraulic power steering cylinder 36 is deactivated by communicating conduit 178 with 176, and steering can be effected by any suitable automotive steering arrangement of conventional design.

Flexibility of pipe-section relocating apparatus can be further enhanced by construction of all frame crossmembers, including tie rod 38, in telescoping sections so that the width of the frame can be adjusted to accommodate any desired crop row spacing. This can be effected in any suitable, conventional manner. Also, if desired, load end portion 44 of conveyor 40 can be hingedly connected to remainder of the conveyor and movable vertically by hydraulic jacks or other suitable power systems. This construction permits location of the load end portion at the height most convenient for any given team of operators.

In operating in accordance with principles of the invention, the apparatus is brought into a field where irrigation sprinkler pipe sections are coupled in end-to-end relationship to define a pipeline. At least the first two of the pipe sections are uncoupled from one another, and movement of the frame is initiated in a direction along the pipeline. The uncoupled pipe sections are deposited on the load end portion of the conveyor as the frame moves along the pipeline and arrives at the location of the respective uncoupled sections. Preferably, at least one operator remains ahead of the machine and uncouples pipe sections sequentially along the pipeline.

Pipe sections deposited on the conveyor are positioned athwart the conveyor with the risers supported by skid 70 and extending in a direction away from the delivery end portion of the conveyor. The pipe sections are transported over the conveyor along a path transverse to the direction of movement of the frame to the delivery end portion of the conveyor, as the frame moves along the pipeline. The conveyed pipe sections are dropped from the delivery end portion of the conveyor into generally end-to-end relationship on the surface of the earth as a result of the constant motion of the frame along the pipeline. The pipes are rolled as they are dropped, to position the pipes on the surface of the earth with the riser in a generally upright position so that operators need not manipulate the pipes to this position. The operators who walk along with the machine at the discharge end portion of the conveyor, couple the dropped pipe sections in end-to-end relationship to form a pipeline spaced from the first pipeline a distance generally equal to the length of the conveyor.

After each pipe drop, pipe retainers 76 are moved to operative positions obstructing the path of the pipe sections on the conveyor to retain on the conveyor any pipe section which reaches the end of the conveyor before the frame reaches the location at which the pipe section is to be dropped After the frame has moved a predetermined distance (the length of one pipe section) from the locus of the preceding pipe drop to a location where discharge of a pipe section will deposit it in close end-to-end relation with the preceding pipe section, the retainers are moved to inoperative positions for delivery of the retained pipe section. The speed of the conveyor is preferably correlated with the speed of the frame so that when the frame arrives at a location for a pipe drop, the retainers are holding a pipe section for immediate dropping upon deactivation of the retainers. The conveyor should never run at a speed that will cause more than one pipe section to be held by the retainer.

Use of sprinkler pipe section relocating systems according to the invention is highly advantageous. The pipe sections can be relocated more rapidly than heretofore, and the task can be done more economically, since less hand labor is required. Further, risk of crop damage is minimized, since foot traffic across and through growing crops is greatly reduced. The speed and efficiency with which pipe sections can be relocated permits a greater flexibility in managing irrigation patterns than had been known in the prior art.

Although the invention has been described in connection with a preferred embodiment, modifications of the illustrated embodiment can be made without departing from the spirit of the invention. Such modifications and variations are within the scope of the invention as defined by the appended claims.

I claim:

1. Article relocating apparatus, comprising:
   a body;
   transporting means mounting the body for movement in a direction;
   conveying means carried by the body for receiving articles, conveying received articles along a path transverse to the direction of movement of the body, and delivering conveyed articles in a direction transverse to the direction of movement of the body to an immobile location;
   retaining means for retaining an article from delivery by the conveying means;
   deactivating means for deactivating the retaining means for delivery of the retained article;
   article spacing control means for controlling the deactivating means for delivery of articles at spaced locations along the direction of movement of the body;
   each article being elongated and including a projection extending transversely to the direction of elongation of the article;
   the conveying means including supporting means, extending along the path of the articles, for supporting the projections on the articles and preventing rolling of the articles on the conveying means;
   the conveying means including spaced-apart conveying members; and
   the supporting means including an elongated skid member extending along the conveying members.

2. The apparatus of claim 1, the article spacing control means including operating means responsive to movement of the body a predetermined distance along the direction of movement of the body, for operating the deactivating means.

3. The apparatus of claim 2, the spacing control means including:
   sensing means for sensing movement of the body the predetermined distance along the direction of movement of the body; and
   the operating means being responsive to the sensing means.

4. The apparatus of claim 1, the retaining means including:
   at least one retaining member mounted for movement to an operative position in which it obstructs the path of the articles, and to an inoperative position in which it is out of the path of the articles; and
   the deactivating means including means for moving each retaining member from the operative position to the inoperative position.

5. The apparatus of claim 1, the skid member being located between two of the conveying members and in generally coplanar relationship with the conveying members.

6. The apparatus of claim 1, the skid member having a projection-receiving groove extending along the path of the articles to maintain the articles in alignment on the conveying means.

7. The apparatus of claim 1, the conveying means including:
   a delivery end portion; and
   the supporting means at the delivery end portion of the conveying means extending at an angle to the horizontal to support the projection in a position for delivery to the immobile location with the projection in a generally upright position.

8. The apparatus of claim 7, the supporting means at the delivery end portion extending at an angle to the horizontal of about 30°.

9. The apparatus of claim 1, including means mounting the conveying means on the body for generally horizontal, pivotal movement over an angular distance of at least 90°.

10. The apparatus of claim 1, the conveying means including a plurality of generally parallel, spaced-apart endless conveyor members, and track means for receiving and guiding each endless conveyor member.

11. The apparatus of claim 1:
   each article being an elongated sprinkler-irrigation pipe section for irrigating a zone having a width dimension transverse to the direction of elongation of the pipe section; and
   the conveying means having a length in the direction of conveyance of the pipe sections which is generally equal to the width dimension of the irrigated zone.